Sept. 4, 1951  R. V. OWEN  2,566,359
CONTINUOUS SAPONIFICATION OF FATS
Filed Jan. 18, 1947  2 Sheets-Sheet 1
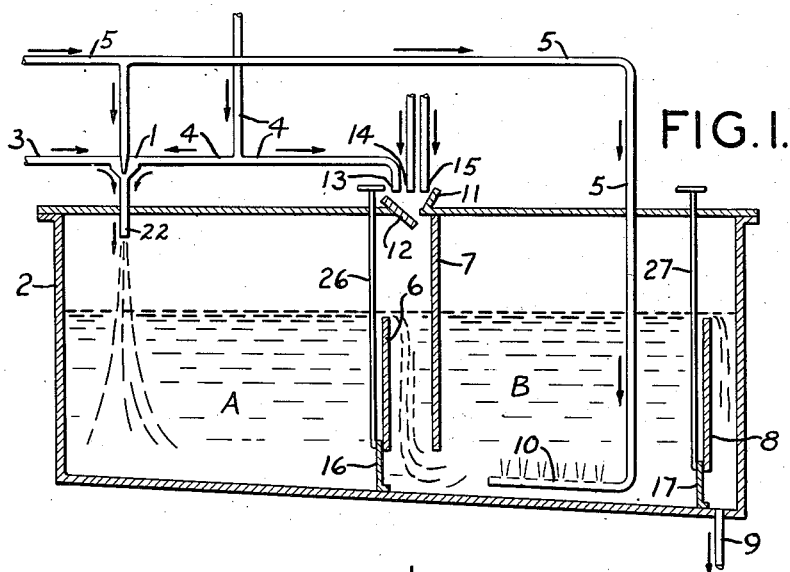
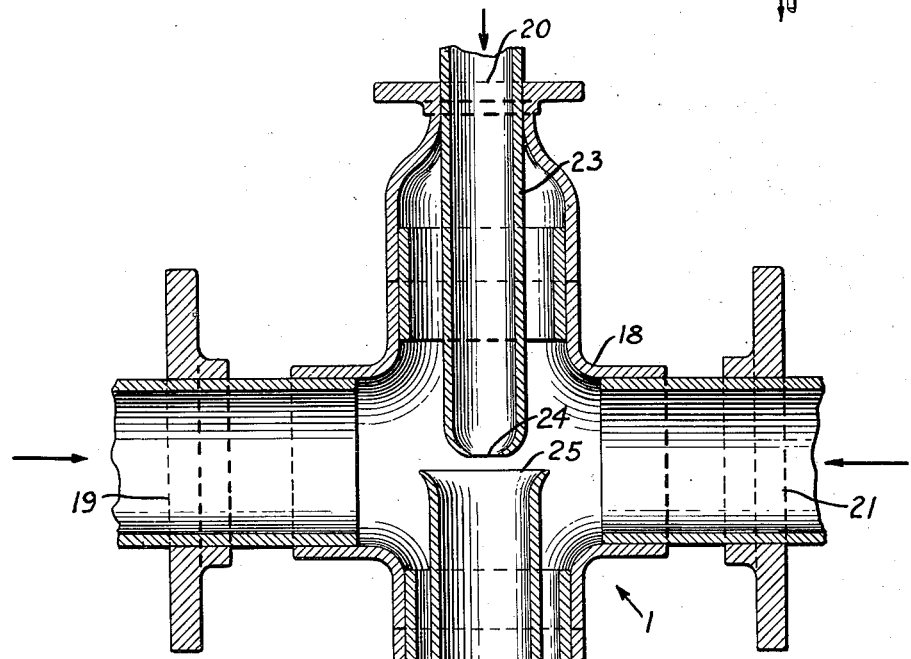
INVENTOR.
RONALD VINCENT OWEN
BY Campbell, Brumbaugh & Free
his ATTORNEYS Sept. 4, 1951 R. V. OWEN 2,566,359
CONTINUOUS SAPONIFICATION OF FATS
Filed Jan. 18, 1947 2 Sheets-Sheet 2

INVENTOR.
RONALD VINCENT OWEN
BY
Campbell, Brumbaugh & Free
HIS ATTORNEYS.

Patented Sept. 4, 1951

2,566,359

UNITED STATES PATENT OFFICE 2,566,359

CONTINUOUS SAPONIFICATION OF FATS

Ronald Vincent Owen, Sale, England, assignor to Lever Brothers Company, Cambridge, Mass., a corporation of Maine Application January 18, 1947, Serial No. 722,794
In Great Britain January 21, 1946

8 Claims. (Cl. 260—413)

The present invention relates to the manufacture of soap by the process of saponification of fats and oils (hereinafter referred to as fats) by means of saponifying agents such as alkalis.

It is an object of the present invention to provide a continuous method of fat saponification by which, as compared with the known procedure, the time and the steam required for the saponification are reduced and which can be subjected to a greater accuracy of control of its performance with a consequent increased uniformity in the quality of soap produced.

In order to understand the method of the present invention and wherein it is an improvement upon the prior art procedure, it is desirable to consider some details of the nature of the process of fat saponification.

It is the theory that, since the liquid fat and the aqueous solution of alkali or other saponifying agent which are the reactants in the process of fat saponification are practically insoluble in each other, the chemical reaction between them takes place either at their interface or in some medium in which both are soluble. Clearly therefore, the greater the extent to which the interface can be spread, the greater will be the primary rate of the reaction between the two liquid ingredients. Such an increase of interfacial area can be brought about either by prolonged agitation of the two liquid ingredients so that new interfaces are being continually exposed, or by short agitation under suitable conditions so as to produce an emulsion, in which, as is well known, the two liquids are brought into close interfacial contact.

When liquid fat and aqueous alkali are briefly agitated together any free fatty acids present in the fats are rapidly saponified by combining with the requisite portion of the alkali. The quantity of soap so produced then acts as an emulsifying agent and an emulsion is quickly formed in which droplets of one of the liquids are coated with a film of soap and are suspended in a continuous phase of the other liquid. Furthermore, since both fat and alkali are to some degree soluble in soap, the film provides a medium situated between them in which the reaction may be favourably promoted. The total concentration of electrolyte in the alkaline liquor usually determines whether the resultant emulsion will be of the "oil in water" type or the "water in oil" type, or indeed whether under given conditions it is possible to produce any emulsion at all. For a particular fat, for example, a concentration of electrolyte of up to 15% may give an "oil in water" emulsion, from 15% to 20%, no emulsion may be produced, and above 20% a "water in oil" type of emulsion may be formed. It must be understood that, since other factors affect the emulsification, the concentrations quoted are not intended to mark the precise boundaries to the phenomena described but merely serve to indicate the general nature of their effect. Other factors, such as temperature, nature of the fat, degree or mode of agitation and amount of soap or free fatty acids originally present, affect emulsification.

Once an emulsion has been firmly formed and if it is allowed to remain quiescent, that is without further agitation, a period of incubation follows, during which self-saponification of most of the fat takes place, at first slowly, then with increasing vigour due, it is believed, to the cumulative effect of the heat generated by the preceding reaction and to the effect of the increasing proportion of soap acting as a mutual solvent for the residual fat and alkali. Finally the reaction slows down as the proportion of residual fat and alkali diminishes and the now greatly augmented bulk of the soap makes it increasingly hard for the remaining fat and alkali to come into contact with one another. To ensure saponification of the remaining fat, therefore, the mixture may once more require agitation to bring about this desired contact of the unreacted ingredients. During the period of incubation, however, agitation should be avoided since it may be harmful in causing a disruption of the emulsion and thus interfere with the natural sequence of the saponification reaction at this stage. This is particularly so during the early stages of the incubation period where only a small proportion of the fat and saponifying agent have reacted. As, however, the amount of soap increases, so any agitation becomes less and less harmful.

The rate and final extent of saponification during this period of incubation may vary according to the type and initial temperature of the emulsion, the nature of the fat, and the concentration or other characteristics of the alkali solution. Generally the formation of a firm emulsion is a prime factor in the promotion of rapid fat saponification and that, of the two possible types, the "water in oil" emulsion is the more efficient in this respect since in this case the fat is spread out thinly as the continuous phase between the soap-coated droplets of aqueous alkali and is thereby exposed with a greater surface effect.

It is an object of the present invention to provide a process for the continuous saponification of fats in which the above described sequence of events is followed.

It is another object of the present invention to provide a continuous process of saponifying fats in which the above mentioned and other disadvantages are avoided.

It is yet another object of the present invention to provide a continuous method of saponifying fat by means of which the time and quantity of steam required for the saponification are reduced and which can be subjected to greater accuracy of control, thus making possible increased uniformity in the quality of soap produced.

These and other objects will become apparent in the disclosure following hereinafter.

According to the present invention there is provided a continuous process of saponifying fat which comprises emulsifying fat and an aqueous saponifying agent and maintaining a substantially quiescent flow of the resulting emulsion so as to allow self-saponification of the fat to take place.

The duration of the quiescent flow and other conditions of the process may be such that during that flow, substantially complete saponification of the fat takes place. However, it is usually found desirable, particularly where it is necessary fully to ensure a complete saponification of the fat, subsequently to subject the mixture to agitation after the period of quiescent flow. Agitation may be carried out, for example by passing the mixture resulting from the process of self-saponification through a vessel in which it is subjected to the agitating action of live steam. Any other means of agitating the liquid may, however, be used.

The advantages of the present invention compared with the customary practice of soap boiling will now be readily understood from the following considerations.

In the customary practice of soap boiling, saponification is carried out in a vessel called a soap pan in which a batch, or charge of fat is boiled with a quantity of alkali solution—usually caustic soda—by means of live steam which issues through the perforations of steam pipes lying at the bottom of the pan. The steam serves to heat and agitate the two ingredients in order to promote the reaction between them. In this case the agitation is usually prolonged and this manner of operating fails to take full advantage of the natural process of saponification, which, as explained above, can take place after the preliminary emulsification.

Initially the reaction tends to proceed slowly, thereafter the rate of the reaction accelerates before finally slowing down again, usually leaving a quantity of unsaponified fat in the pan. During this procedure the operator, according to his experience varies the amounts of live steam issuing from the open steam coils and adds, especially during the period of acceleration, a quantity of strong brine or water in order to control the course of the reaction which may tend to ball or congeal the soap into a thick mass, or which may cause the soap mass rapidly to swell and boil over.

The use of live steam issuing from perforated coils at the bottom of the soap pan is of poor mechanical efficiency as a means of promoting the emulsification of the relatively large mass of fat and alkali liquor. Furthermore this method is wasteful of steam, since the agitation is generally continued throughout the operation and no period of comparative rest is allowed for the incubation during which the self-saponification of the residual fat takes place, thereby interfering with the natural sequence of events as described above. Since the whole contents of the pan are quickly brought to, and maintained at, the boiling point, the heat evolved by the reaction tends to evaporate steam from the pan. Another disadvantage of the method is that, because the course of the reaction is subject to such diverse influences as the nature of the fat charge or the strength of the alkali liquor or the presence of residual soap in the pan, its control varies according to the personal judgment of the operator with the result that varying amounts of steam, water or brine may be added to the soap; thus causing in the final composition of the batches of soap produced, undesirable fluctuations which may be prejudicial to the efficiency of the subsequent operations.

By the present invention the waste of steam employed in what is now realised to be the unnecessarily prolonged, even harmful agitation during the greater part of the saponification in this customary soap boiling procedure is avoided, and use is made of the heat of reaction of the ingredients to attain the desired temperature.

It will be seen that, as compared with the prior art procedure the present invention provides for a saponification method which more suitably conforms to the natural sequence of the physical and chemical processes of the reaction previously described. The method of the invention may be thus described as a short initial agitation of fat and a suitable saponifying agent in order to promote an emulsion between them, followed by a period wherein agitation is not allowed to interfere with the self-saponification of most or all of the remaining fat, and finally where necessary, a period of further agitation in order substantially to complete the saponification of any residual fat. As a result of this the new process effects an economy of steam and time over the prior procedure. In the method of the invention the flows of the ingredients and the saponification process itself are both continuous and the whole process can be subjected to a more accurate control, which confers upon the quality of the product a greater uniformity than is possible with the prior method.

To effect saponification in a short time, heat is preferably supplied to the fat and saponifying agent either before or during their passage through the emulsifying device, or at both times. The agitation following the self-saponification may be carried out by any suitable means, but most conveniently by the aid of a small quantity of live steam which also serves for heating.

In a preferred form of the present invention the emulsification of the fat and saponifying agent is carried out by means of a steam injector, that is a device in which a jet of steam is used to cause a flow of fat and saponifying agent to mix intimately and emulsify. A high degree of emulsification between the fat and saponifying agent should preferably be produced, as the degree of emulsification is an important factor affecting the rate of saponification in the incubation period. For this purpose the presence of an emulsifying agent during the emulsifying process is essential. The emulsifying agent will usually be derived from the saponification of free fatty acids in the fat, which are instantaneously neutralised to form a soap. If the fat has only a very small or, in very rare cases no free fatty acid content, it may be desirable to provide an emulsifying agent; for example, free fatty acids or rosin may be added to the fat or an emulsifying agent such as soap may be added to either the saponifying agent or the fat, preferably the latter. It is found, however, that with all known fat charges used for soap making, even those containing very low amounts of free fatty acids, a satisfactory emulsion which will undergo the process of self-saponification under quiescent conditions can be produced, by suitable choice of the means of emulsification. In general, the lower the amount of emulsifying agent present, for instance due to a lower free fatty acid content of the fat charge, the longer will be the incubation time required. The addition of emulsifying agent in the form of soap or added fatty acid is only desirable in cases therefore where the natural incubation period of the emulsion is too long for the practical requirements of manufacture.

In this specification the term alkali liquor is intended to include any solution of caustic alkali or other liquid capable of effecting the saponification of fat. Self-saponification is that part of the process wherein the saponifying reaction is allowed to proceed without the aid of further heat or agitation.

The invention will now be described with reference to the accompanying drawings in which:

Fig. 1 shows an arrangement of vessels for carrying out the process.

Fig. 2 shows a steam injector for effecting emulsification.

Figure 3:
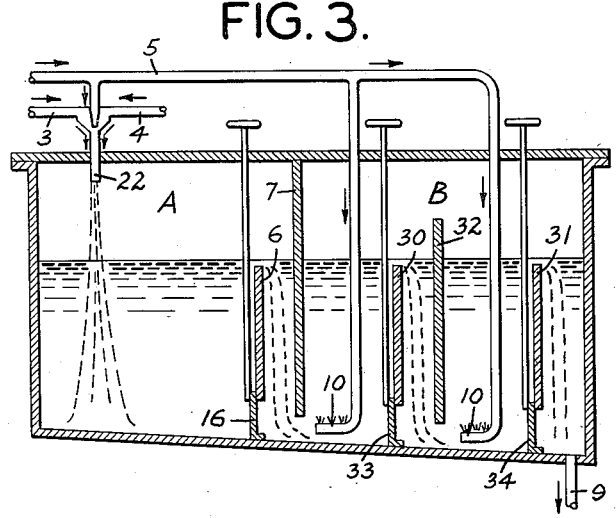
Fig. 3 shows an alternative form of part of Fig. 1.

Referring to the drawings, the instrument for the fat emulsion is indicated at 1; it may be of any suitable design, but a form of steam injector fed by the fat supply pipe 3, caustic alkali supply pipe 4 and steam pipe 5, is preferred such as is described in detail below and is shown more particularly in Fig. 2. The vessel 2 is divided into two compartments A and B. The compartment A forms an incubation zone and is arranged to receive the emulsion and to provide space and time for it to move through in a quiescent flow to allow for an incubation period during which self-saponification may take place. The compartment B is designed as a compartment wherein the saponification when necessary can be brought substantially to completion. The two compartments A and B are separated by the divisions 6, which is of such height and position as to allow sufficient working "head" room in the vessel and yet to allow a volume capacity in either compartment necessary and sufficient to permit a required transit time for a given throughput. In comparment A the transit time for a required throughput should not be less than the incubation period it is desired to allow to be given to the fat emulsion; an extra allowance of volume, and therefore of transit time, may be provided in order to cater for varying conditions and fat charges. It has been found that a transit time of about twenty minutes is generally sufficient to meet the requirements of most fat charges. The dimensions of the compartment B may be considered as similar to those of A. The division 6 also acts as a weir plate over which the saponified emulsion flows; and a baffle plate 7 forces the overflowing mass down to the bottom of the compartment B in order to reduce short-circuiting of the flow before it passes over the weir plate 8 to be withdrawn from the vessel down the pipe 9.

For the purpose of substantially completing the saponification of the soap-containing mass, where this is necessary or desired a continuous method of agitation is provided in the compartment B; any suitable means may be employed, and that illustrated is a small perforated coil 10 supplied with live steam from the pipe 5. The narrow trough 11 is fitted to the cover of the vessel 2 above the overflow from the weir plate 6 into which are sprayed any small quantities of caustic liquor, brine or water from the perforated pipes 13, 14 and 15 respectively that it may be necessary or desirable to add to the soap. Perforations in the bottom of the trough permit such additional liquors to pass down on to a spreader plate 12 in order that they may be evenly admixed with the soap. The dampers 16 and 17 are provided for the purpose of draining all the soap from the vessel when desired.

Referring to Figure 2 of the drawings, a jet for rapidly effecting the mixing of a saponifying agent and a liquid fat to be saponified comprises a pipe junction 18 having three inlets 19, 20 and 21 and a discharge pipe 22 provided with a bell-shaped opening 25. The inlet 20 which is opposite the discharge pipe 22 is provided with a steam pipe 23 which opens in a nozzle 24 lying near the inner bell-shaped opening 25 of the discharge pipe 22. Caustic soda is fed to the inlet 19 and liquid fat to the inlet 21, steam being supplied under constant pressure to the inlet 20. The jet of steam which issues from the nozzle 24 effects intimate emulsification of the fat and caustic soda which are discharged through the discharge pipe 22. It has been found that the admixture of a small quantity of sodium chloride—usually about 3%—to the caustic liquor exerts a beneficial effect on the ultimate course of the reaction since it lowers the viscosity of the soap produced, making it more fluid, and greatly diminishes the swelling of the soap during the self-saponification period.

The process is commenced by starting the steam feed to the injector, starting the fat flow, and then adjusting the caustic liquor supply to the correct amount necessary for the saponification. The steam supply is further regulated to give the correct temperature of the ejected emulsion which now proceeds to fill the compartment A of the vessel. Here, under conditions of a quiescent flow the emulsion is permitted time for incubation and self-saponification in order to produce a soap containing mass whose fluidity and degree of swelling is controlled by the quantity of sodium chloride originally present in the caustic liquor. Fresh emulsion, continually dropping into this compartment, being at a lower temperature and a greater density than the resultant soap, falls to the bottom, gently displacing the soap without disrupting the emulsion. The soap thus overflows over the weir plate 6, at which stage is provided, if desired, a small adjusting flow of extra caustic liquor, brine or water as may be found desirable, from the pipes 13, 14, 15 respectively through the trough 11 and the spreader plate 12. A temperature control on this compartment should indicate the overflowing contents to be at slightly lower than the boiling point of the soap mass, otherwise corrections should be made to the inflowing ingredients flowing into the steam injector.

Being guided down to the bottom of the compartment B by the baffle plate 7 the soap becomes subjected to the continuous agitation of the steam from the small open steam coil 10 by virtue of which the saponification is substantially completed. A further effect of the operations within this compartment is that any small additions of liquors made through the trough 11 are thoroughly incorporated with the soap which, combined with the control of the flow of original ingredients to the injector, provide a product whose composition varies within only comparatively narrow limits. Finally the soap passes evenly, and without excessive short circuiting of its passage through the equipment, over the weir plate 8 to be withdrawn down the pipe 9.

Agitation in the compartment B may be augmented and made more intimate by the provision of an extra baffle, or baffles, which will reduce possible short-circuiting of the passage of the soap to a minimum and at the same time decrease the amount of live steam required to promote agitation. In Fig. 3 is shown a suitably arranged vessel for achieving agitation by this means. The soap, flowing over weir 6 and directed down to the bottom by the baffle 7 as in Fig. 1, is then caused to flow over a second weir 30 and again down to the bottom by baffle 32. Finally the soap passes over a third weir 31 whence it flows away down pipe 9. Weirs 30 and 31 are provided with sluices 33 and 34 respectively. The small open steam coils 10 provide further agitation if required.

The caustic liquor may be supplied hot or cold but the combined temperature of the mixture of the liquor with the melted fat must be such that sufficient allowance is made for the additional heat resulting from the condensation of a requisite quantity of steam whose dynamic energy is necessary for the formation of a firm emulsion. At the same time it must be borne in mind that, since any free fatty acids which may be present in the oil will instantly be saponified within the injector with a proportionate liberation of heat of reaction, the temperature of the ejected emulsion may be higher than that given by the combined heats of the ingredients themselves. During the self-saponification of the emulsion in the compartment A, still more heat of reaction is liberated. Hence the temperature of the ejected emulsion should be such as to allow for this latter increase in heat to bring the total temperature to no higher than the boiling point of the mass otherwise heat will be lost by the evaporation of steam.

The type of steam injector shown in Fig. 2 is capable of producing both kinds of emulsion. If the "water in oil" type of emulsion is desired, then the initial concentration of electrolyte in the alkaline liquor should be such that the amount of steam condensed within the emulsion will not dilute the electrolyte concentration to the point where no "water in oil" type of emulsion may be possible.

Alternatively a form of steam injector may be used in which the discontinuous phase (the saponifying agent) is atomised by the steam jet and injected into the continuous phase (the fat). Such types of injectors are well known, and have the advantage of producing a high degree of emulsification.

The following data may be cited by way of example. An injector carrying 1½ inch diameter feed pipes and a ¼ inch diameter steam jet fed by a steam pressure of about 80 lbs. per square inch has been found capable of emulsifying 7–8 tons per hour of fats; the combined temperature of the fat and caustic liquor mixture being 40°–60° C., and that of the resultant emulsion being 60° C.–85° C.

The following table shows certain results which have been obtained:

| Fat Charge | Free Fatty Acid Content | Temperature of Oil | Temperature of Emulsion | Time to self-saponify to the extent of 98–100% |
| --- | --- | --- | --- | --- |
|  | Per Cent | °C. | °C. | Minutes |
| Neutralised palm oil | 0.63 | 54 | 61 | 23.0 |
| Palm Oil | 46.2 | 52 | 85 | 2.0 |
| Palm kernel oil | 6.4 | 52 | 62 | 5.0 |
| Groundnut oil | 17.4 | 54 | 74 | 4.2 |
| Mixed oils | 1.7 | 46 | 59 | 3.5 |
| Do | 20.0 | 43 | 70 | 1.0 |

Substantially chemically equivalent proportions of fat charges and caustic liquor, containing 27–30% of caustic soda were used in the above results. The temperature of the final self saponified soap mass was in all these cases approximately 100° C.

It will be seen therefore from the above that even with Palm Oil of so low a free fatty acid content as 0.63%., practically full self-saponification can take place. In none of the above examples was any additional soap, rosin or free fatty acid added. In the case of the Palm oil with 0.63% free fatty acid the addition of soap, for example, to either the caustic liquor or the fat charge would substantially decrease the incubation period necessary for self-saponification.

Thus the steam injector is capable of emulsifying fats containing as little as 1% or less of free fatty acids but with the lower proportions the period of incubation is usually prolonged. Rosin, rosin soap or soap may be added to, or dissolved in, the fat in order to promote, if necessary, the emulsification and its consequent reaction. Fats containing high proportions of free fatty acid, when passed through the steam injector will undergo instantaneous saponification of their free fatty acid content to give a quantity of emulsifying agent (soap) sufficient to give a short incubation period, as illustrated by, for instance, the second and the last examples in the above table. Any alkali liquor capable of saponifying a fat or fatty acid may be employed with the jet described.

Though, in the practice of the invention, it is preferable for reasons of economy to obtain as high an extent of self-saponification as possible in the incubation stage, as has been illustrated in the above examples, the invention is not limited to cases where such high extents as 98% to 100% saponification is obtained in this stage. Any lower extent of saponification within the first compartment is permissible; in which case, if it is desired to complete the saponification, an increased amount of agitation will be required in the second compartment. It will be understood that this may involve an interruption of the full sequence of the natural process of self-saponification, and the resultant increase in the amount of agitation necessary to obtain full saponification will represent a lowering of the efficiency of operation.

Where, however, the desired degree of saponification of the fat charge is achieved by self-saponification of the emulsion during the period of quiescent flow, the agitation stage of the process may be dispensed with, and the mixture as it leaves the compartment in which the self-saponification takes place may pass directly, without being subjected to agitation, to the subsequent stages of the soapmaking process. Whether agitation be employed or not, partial saponification of the fat charge, resulting in a soap containing fat, may be achieved by reducing the proportion of saponifying agent to below that theoretically required for full saponification.

For operating the process it is preferable to provide "constant head" or other means of constant pressure flows of fat and caustic liquor, the fat flow being regulated by a fixed orifice in the supply pipe and the flow of caustic liquor being controlled by a variable orifice or valve adjusted to provide the correct feed for the saponification. Steam at a constant pressure is desirable but not absolutely essential. Temperature controls of the ingredients, including a heating jacket on the fat feed pipe, are also recommended.

A two-compartment vessel of 10 tons overall capacity constructed and operated as described above, and supplied by a steam injector also as described above, provides an equipment capable of continuously producing up to 10 tons per hour of soap saponified to the extent of 99–100% and of a constancy in the composition of its other characteristics such as would not be possible by the operation of the customary procedure.

Figure 4:
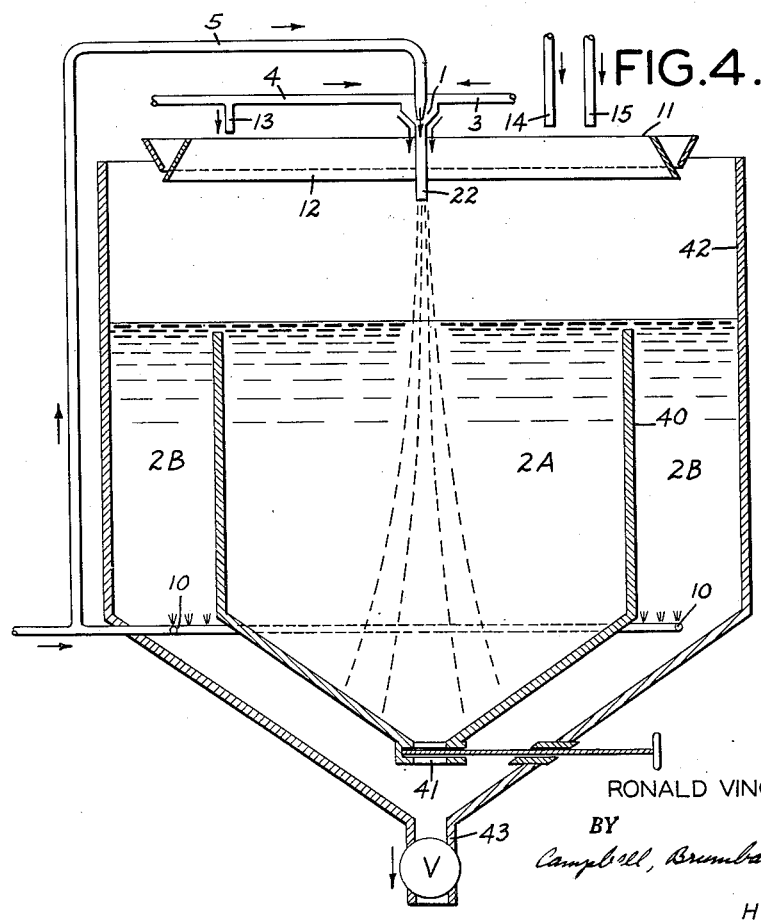
Fig. 4 shows an alternative arrangement to that shown in Fig. 1.

An alternative arrangement of the compartments in which respectively the quiescent flow of the self-saponifying emulsion and the agitation take place is illustrated in Fig. 4, to which reference will now be made. The injector 1 is supplied by fat supply pipe 3, caustic alkali pipe 4 and steam pipe 5, as described with reference to Fig. 1. The issuing emulsion falls to the bottom of the vessel 40 providing the space 2A within which the quiescent flow of the self-saponifying emulsion takes place. The vessel 40 is in the form of a round or square tank with a conical bottom, fitted with a discharge sluice 41 for emptying. This sluice is normally closed, and the emulsion, having filled the vessel 40 flows over the top (which corresponds to the weir 8) into the space between the vessel 40 and an outer vessel 42. The space between the two vessels 40 and 42 thus forms the agitation compartment 2B. A steam coil 10 agitates the liquid which passes down the compartment against the uprising steam and leaves through the outlet pipe 43. Additions of alkali, brine or water from pipes 13, 14, and 15 are made into the trough 11 which runs over the compartment 2B, and is provided with a spreader plate 12 as in the arrangement of Fig. 1.

The arrangement of Fig. 4 has the advantage of providing a smaller surface for heat losses, and of giving improved agitation of the liquid in compartment 2B by virtue of the countercurrent flow of steam and liquid.

The precise degree of final saponification may be judged by customary methods, such as by inspection, from the condition of the soap flowing over the weir 8, or over the top of the vessel 40 and adjustments of the caustic liquor supply are made in consequence of these inspections.

Preferably, however, the desired information as to the degree of saponification and other conditions is obtained by the means of suitable instruments, which may, if desired, be arranged, in any well known or suitable manner, to control the flow of caustic liquor or other operating factors automatically. It will be noted that, as compared with the prior procedure in which the operator endeavours to control the saponification by adding brine during the boiling, the present process supplied with the pre-salted caustic liquor is already more accurately assured of such control.

In place of the steam injector shown in Fig. 2 any other known or suitable kind of continuously operating mechanical emulsifier may be used. A steam injector, however, is the preferred form of emulsifier, as control of the pressure and rate of supply of steam forms a simple and convenient means of adjusting within limits the final temperature of the issuing emulsion and the subsequent course of the emulsification process.

I claim:

1. A continuous process of saponifying fat which comprises continuously and rapidly mixing a continuous stream of liquid fat with a continuous stream of saponifying agent to emulsify intimately and substantially instantaneously the fat and saponifying agent in said streams and form a continuous stream of emulsified fat and saponifying agent, the proportion of saponifying agent in relation to the proportion of fat in said initial streams being up to about the amount stoichiometrically required to saponify completely the fat in said fat stream and the temperatures of said initial streams of fat and saponifying agent being adjusted to give the continuous stream of emulsified materials an initial temperature below the boiling point; continuously introducing said stream of emulsified materials into a quiescent incubation zone containing an emulsion of unsaponified fat and saponifying agent, and self-saponified fat, wherein the proportion of self-saponified fat to unsaponified fat and saponifying agent increases toward the surface of the contents in the incubation zone and the temperature increases gradually from below the boiling point at the bottom to aproach the boiling point of the contents at the surface, the freshly introduced stream of emulsified fat and saponifying agent falling to the bottom of the incubation zone, reacting exothermically to saponify at least a major portion of said fat, and rising gradually and continuously to form a surface layer of emulsion wherein up to 100% of the fat is in a self-saponified state, the balance of the fat being unsaponified and occluded in said layer together with any unreacted saponifying agent, the rate of entry of the continuous stream of emulsified materials being adjusted to the volume of the quiescent incubation zone to permit undisturbed self-saponification of at least the major portion of the fat in said incubation zone; and continuously withdrawing from the surface of the contents in the quiescent incubation zone, by overflow, a thin stream of said surface layer.

2. The continuous method of saponifying fat as defined in claim 1 wherein the initial and continuous streams of fat and saponifying agent are intimately and substantially instantaneously emulsified by confluence with a continuous, high velocity jet of steam.

3. The continuous method of saponifying fat as defined in claim 1 wherein an emulsifying agent is added to one of the initial and continuous streams of fat and saponifying agent to intimately and substantially instantaneously emulsify the fat and saponifying agent.

4. The continuous method of saponifying fat as defined in claim 1 wherein the initial and continuous stream of fat contains free fatty acids forming continuously, by instantaneous saponification thereof upon contact with the continuous stream of saponifying agent, soap for promoting the intimate and substantially instantaneous emulsification of fat and saponifying agent.

5. The continuous method of saponifying fat as defined in claim 1 wherein a small proportion of sodium chloride is continuously added to the continuous stream of saponifying agent emulsified with the continuous stream of fat.

6. The continuous method of saponifying fat as defined in claim 1 wherein the thin stream of surface layer continuously withdrawn from the surface of the contents in the quiescent incubation zone is continuously introduced into and passed through a zone of agitation to bring any unsaponified fat occluded therein into intimate contact with unreacted saponifying agent and thereby bring to substantial completion the saponification of the fat introduced in the initial stream of fat.

7. The method defined in claim 6 wherein live steam is liberated in the bottom of the zone of agitation to promote the saponification of any unsaponified fat occluded in the thin stream of surface layer continuously withdrawn from the surface of the contents in the quiescent incubation zone.

8. The continuous method of saponifying fat as defined in claim 1 wherein the temperatures of the initial streams of fat and saponifying agent are adjusted to give the continuous stream of emulsified materials an initial temperature between about 60° C. and 85° C.

RONALD VINCENT OWEN.

REFERENCES CITED

The following references are of record in the file of this patent:

UNITED STATES PATENTS

| Number | Name | Date |
|---|---|---|
| 1,831,610 | Schuck | Nov. 10, 1931 |
| 1,904,021 | Weber et al. | Apr. 18, 1933 |
| 2,336,893 | Scott | Dec. 14, 1943 |
| 2,411,468 | Sender | Nov. 19, 1946 |
| 2,411,469 | Sender | Nov. 19, 1946 |

OTHER REFERENCES

"Soap and Sanitary Chemicals"; July 1938, pages 21–24 by Boone.